US009533654B2

(12) United States Patent
Talty et al.

(10) Patent No.: US 9,533,654 B2
(45) Date of Patent: Jan. 3, 2017

(54) VEHICLE DATA SERVICES ENABLED BY LOW POWER FM TRANSMISSION

(75) Inventors: Timothy J. Talty, Beverly Hills, MI (US); David T. Proefke, Troy, MI (US); Craig Atiyeh, Grand Blanc, MI (US); Alan T. Budyta, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 836 days.

(21) Appl. No.: 13/314,016

(22) Filed: Dec. 7, 2011

(65) Prior Publication Data

US 2012/0158213 A1 Jun. 21, 2012

Related U.S. Application Data

(60) Provisional application No. 61/424,488, filed on Dec. 17, 2010.

(51) Int. Cl.
*B60R 25/20* (2013.01)
*B60R 25/24* (2013.01)
*G07C 9/00* (2006.01)

(52) U.S. Cl.
CPC .......... *B60R 25/24* (2013.01); *G07C 9/00309* (2013.01); *B60R 2325/205* (2013.01)

(58) Field of Classification Search
CPC .................................................. B60R 25/24
USPC .............. 701/2; 340/426.36, 426.13, 426.15, 340/426.16, 426.17
See application file for complete search history.

(56) References Cited

U.S. PATENT DOCUMENTS

| 5,379,033 | A * | 1/1995 | Fujii et al. .................... 340/5.64 |
| 6,175,805 | B1 * | 1/2001 | Abe .............................. 701/533 |
| 6,326,885 | B1 * | 12/2001 | Togashi .............. B60R 25/1003 307/10.2 |
| 8,094,007 | B2 * | 1/2012 | Hinkson .................. G08B 3/10 340/12.5 |
| 2001/0038328 | A1 * | 11/2001 | King et al. .................... 340/5.64 |
| 2005/0165639 | A1 * | 7/2005 | Ross et al. ...................... 705/14 |
| 2005/0280529 | A1 * | 12/2005 | Hinkson .................. G08B 3/10 340/539.1 |
| 2007/0075848 | A1 * | 4/2007 | Pitt ....................... B60R 25/102 340/426.2 |
| 2007/0075849 | A1 * | 4/2007 | Pitt ....................... B60R 25/102 340/426.2 |
| 2007/0205862 | A1 | 9/2007 | Brillon |
| 2009/0146846 | A1 * | 6/2009 | Grossman ..................... 340/988 |
| 2009/0197584 | A1 * | 8/2009 | Snow et al. .................. 455/418 |
| 2010/0117868 | A1 * | 5/2010 | Van Wiemeersch et al. 340/989 |
| 2010/0255772 | A1 * | 10/2010 | Hellman ...................... 455/3.06 |
| 2011/0043328 | A1 * | 2/2011 | Bassali ......................... 340/5.71 |

(Continued)

FOREIGN PATENT DOCUMENTS

CN 2870328 Y 2/2007

*Primary Examiner* — Thomas G Black
*Assistant Examiner* — Peter D Nolan
(74) *Attorney, Agent, or Firm* — John A. Miller; Miller IP Group, PLC

(57) ABSTRACT

A vehicle system and method that include a smart phone for communicating with a vehicle by an authorized user. The vehicle includes an FM transmitter that transmits vehicle information, including an authorization code, using an FM signal. The FM signal is received by the smart phone which deciphers the information, and automatically transmits a command signal back to the vehicle to perform a pre-programmed vehicle operation, such as unlocking the vehicle doors.

20 Claims, 1 Drawing Sheet

(56) References Cited

U.S. PATENT DOCUMENTS

| | | | |
|---|---|---|---|
| 2012/0021808 A1* | 1/2012 | Tseng ................. | 455/575.1 |
| 2012/0023463 A1* | 1/2012 | Tseng et al. ........... | 715/866 |
| 2012/0158213 A1* | 6/2012 | Talty et al. ............ | 701/2 |
| 2012/0329441 A1* | 12/2012 | Tseng ................. | 455/418 |
| 2013/0035080 A1* | 2/2013 | Frost et al. ........... | 455/414.1 |
| 2013/0196601 A1* | 8/2013 | Bobrow et al. .......... | 455/41.2 |

\* cited by examiner

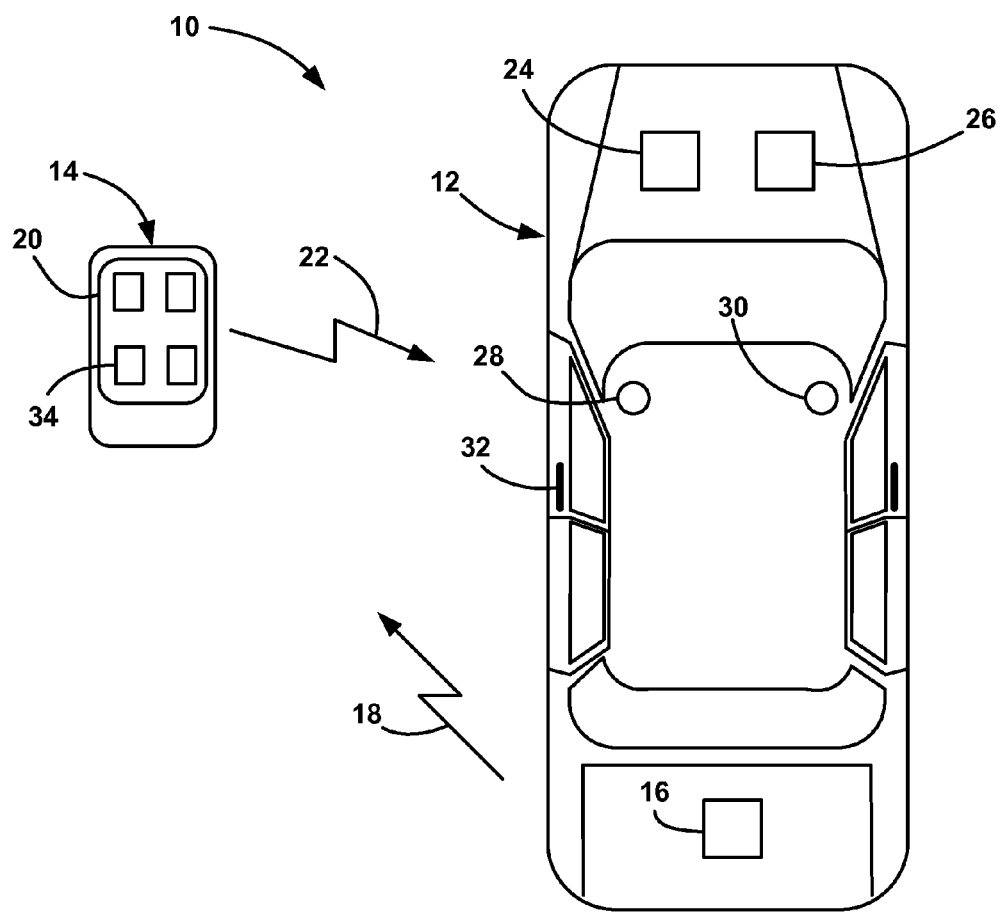

VEHICLE DATA SERVICES ENABLED BY LOW POWER FM TRANSMISSION

CROSS-REFERENCE TO RELATED APPLICATIONS

This application claims the benefit of the priority date of U.S. Provisional Patent Application Ser. No. 61/424,488, titled Vehicle Data Services Enabled by Low Power FM Transmission, filed Dec. 17, 2010.

BACKGROUND OF THE INVENTION

1. Field of the Invention

This invention relates generally to a vehicle system and method where a vehicle transmits FM signals to a smart phone and, more particularly, to a vehicle system and method where a vehicle transmits vehicle information on an FM frequency band that is received by a smart phone, and where the smart phone transmits a command signal back to the vehicle to perform some operation in response to receiving the FM signal.

2. Discussion of the Related Art

Modern vehicles typically include a key fob that wirelessly transmits RF command signals to a vehicle controller to perform certain vehicle functions, such as lock the doors, unlock the doors, open the trunk, open the hatch, start the engine, turn on a security light, etc. The vehicle operator will press a particular push button on the key fob that typically has an image of the function that the button provides in order to transmit the command signal to the vehicle. The transmission is coded in such a manner that not only does the command perform a certain operation, but also protects the transmission from being recorded and resent by a third party. Key fobs of this type typically have a limited range, and provide a convenience factor for the vehicle operator.

Modern vehicles also typically allow a vehicle driver to set various vehicle devices and systems, such as vehicle mirrors, seats, pedals, radio, etc., to a particular desirable setting, and then allow the driver to record those settings as pre-sets by activating a storing button. If the settings are changed from the last time the vehicle driver drove the vehicle, such as by another vehicle driver, then that vehicle driver can activate the pre-sets, such as by pressing the storing button or another button, so that all of the devices are returned to the desirable position for that driver. A signal transmitted from the key fob identifying the vehicle driver can be used to set the various vehicle devices and system to the pres-set conditions, where the particular key fob is unique to the vehicle driver.

Systems have been proposed for a vehicle that cause a vehicle door handle to retract into the vehicle door for security purposes and upon detection of an authorized user will extend the handle to allow the driver to gain access to the vehicle. Current systems that deploy a vehicle handle from a retracted position may require about ten feet between when an authorized vehicle user is detected and when the user arrives at the vehicle to perform the operation satisfactorily.

As mentioned above, a typical system that allows a key fob to provide vehicle commands is activated by the vehicle driver or other authorized user using the key fob. It is desirable in some vehicle designs to cause the vehicle to perform the particular function automatically as the user approaches the vehicle, where the user is not required to actively transmit the signal. One known system, referred to as a passive entry passive start (PEPS) system, periodically interrogates or polls the area immediately around the vehicle to detect the key fob using a low frequency (LF) pulsed signal (30-300 kHz) transmitted from the vehicle at a predetermined pulse rate. The pulse width and the pulse rate of the polling signal is set based on how fast the user could be approaching the vehicle and how far from the vehicle it is desirable to first detect the user. When the key fob receives the low frequency pulsed polling signal, and authenticates it, the key fob will automatically transmit a command signal to the vehicle so that the vehicle will perform the particular function that is has been programmed to perform.

Low frequency signals are typically used for the key fob polling because they only radiate a short distance. Further, because of the short range of the low frequency pulsed polling signal, it is possible to interrogate directionally, such as at the left or right side of the vehicle or the front or rear of the vehicle. Thus, because the vehicle can know the direction of the approaching user, the vehicle need only open the door for that side.

Generating and transmitting low frequency signals typically requires a large amount of current, typically on the order of about 700 mA, for each pulse that is transmitted. Therefore, the amount of time that the vehicle is able to provide the pulsed polling signal at the low frequency before the vehicle battery voltage is reduced to an unacceptable state-of-charge, below which the driver may not be able to start the vehicle, is relatively short, for example, on the order of 12-24 hours. When this time has passed since the last time the vehicle was started, the PEPS system will go into a sleep mode, and not be able to provide the polling signal.

SUMMARY OF THE INVENTION

In accordance with the teachings of the present invention, a vehicle system and method are disclosed that include a smart phone for communicating with a vehicle by an authorized user. The vehicle includes an FM transmitter that transmits vehicle information, including an authorization code, using an FM signal. The FM signal is received by the smart phone which deciphers the information, and automatically transmits a command signal back to the vehicle to perform a pre-programmed vehicle operation, such as unlocking the vehicle doors.

Additional features of the present invention will become apparent from the following description and appended claims, taken in conjunction with the accompanying drawings.

BRIEF DESCRIPTION OF THE DRAWING

FIG. 1 is an illustration of a vehicle system including a vehicle communicating with a smart phone.

DETAILED DESCRIPTION OF THE EMBODIMENTS

The following discussion of the embodiments of the invention directed to a vehicle system including a vehicle that communicates with a smart phone over the FM frequency band is merely exemplary in nature, and is in no way intended to limit the invention or its applications or uses.

As will be discussed in detail below, the present invention proposes a technique that leverages, for example, a Bluetooth pairing process between a consumer's smart phone/consumer electronic (CE) device and a vehicle to secure the communications between the vehicle and the CE device and to determine if the CE device is an authorized device.

Bluetooth device pairing is well understood by those trained in the art and can be accomplished by three methods, namely, 'Just Works', 'Alphanumerical Key Entry' and 'Out of Band' key exchange. In all three methods, the pairing devices exchange information including the exchange of private information that is only known to the pairing devices. This private information is used to establish connections in future encounters. For example, when pairing a CE device with a vehicle, the CE device and the vehicle exchange information known only to those two devices. The next time the CE device and vehicle are within the Bluetooth radio frequency range, the devices can automatically establish a Bluetooth session based on the private information that was previously shared between the devices. This invention employs that private information, but in the FM frequency communications band. That is, the CE device and the vehicle exchange the private Bluetooth information over the FM frequency band. Thus, the CE device and the vehicle are able to verify/confirm that the CE device and vehicle are authorized devices. The private information can also be used to secure the data exchange between the CE device and the vehicle through encryption processes that uses the private information as an encryption key, which is well known to those trained in the art.

FIG. 1 is an illustration of a vehicle system 10 including a vehicle 12 in communication with a smart phone 14, which is intended to generally represent the CE device discussed above, that can be carried by an authorized user of the vehicle 12. The vehicle 12 includes an FM transmitter 16 that transmits a signal 18 in the FM frequency band including various vehicle information and data, such as fuel level, battery state-of-charge, tire pressure, etc. Any information about the vehicle 12 concerning the status of the vehicle 12 can be provided on the signal 18 that may be of interest to the user. The smart phone 14 receives the signal 18 from the vehicle 12 and, as the authorized smart phone 14 for the vehicle 12, is able to decipher the information and data using a compatible application 34 stored on the phone 14. The vehicle information can be displayed on a display screen 20 on the phone 14. The smart phone 14 can use the information from the vehicle 12 in any number of different ways.

When the smart phone 14 receives the signal 18, the application 34 can also cause the phone 14 to send a command signal 22 back to the vehicle 12 to cause the vehicle 12 to automatically perform some predetermined vehicle operation, such as unlocking the vehicle doors, opening a back hatch, rolling down windows, starting the vehicle 12, etc., without intervention by the user. The vehicle 12 includes various modules that perform various operations on the vehicle 12 in response to receiving the command signal 22, such as a body control module (BCM) 24 and a vehicle control module 26, all well known to those skilled in the art. The vehicle 12 can also include security lights 28 and 30 that can be automatically turned on in response to receiving the command signal 22, and retractable door handles 32 in the doors of the vehicle 12 that can be extended automatically upon receiving the command signal 22. The application 34 can be tailored for any particular user and any particular vehicle to perform various operations automatically that the user desires.

Because most vehicles have FM radios, they are already equipped with the components necessary to be used in association with the FM transmitter 16, such as an antenna, coaxial cable, etc., to transmit the FM signal 18. Low power FM transmissions are commonly used on CE portable devices as an audio interface to a vehicle entertainment system to play MP3 signals and otherwise. Thus, the vehicle 12 can be readily equipped to transmit a low power FM signal with specific vehicle information and coding. In one non-limiting embodiment, the FM transmitter 16 transmits the signal 18 about once every second suitable for the purposes described herein. The rate at which the pulses are transmitted could depend on the range and distance that the smart phone 14 can receive the transmissions from the vehicle 12. The transmission signal 18 would consume about 1 mA of current for each transmission pulse, which is significantly lower than the PEPS polling signal discussed above.

The current trend in smart phone technology, such as the current generation of Android phones, is to include FM radios along with the other various systems and applications on the phone. Thus, the smart phone 14 is able to receive and demodulate FM frequencies, and when it receives a particular FM frequency signal transmitted by the vehicle 12, and includes the proper application 34, will be able to decode and download information about the vehicle 12 provided on the signal 18. The application 34 on the smart phone 14 receives the FM signal, checks the vehicle information and code, and if the FM signal is from an authorized vehicle 12, the phone 14 enables various applications and data exchange with the vehicle 12. The FCC allows low power FM transmissions without a user license. By complying with the low power requirements of FCC part 15, the range of the FM transmission signal 18 from the vehicle 12 is limited to the immediate vicinity of the vehicle 12.

Current smart phones do not include FM transmitters, only receivers, and therefore the command signal 16 transmitted from the smart phone 14 back to the vehicle 12 needs to be in some other format other than FM. The present invention contemplates any suitable short range peer-to-peer transmission format, such as Bluetooth™, WiFi™, etc. Also, the smart phone 14 can transmit the command signal 16 to the vehicle 12 through the cellular telephone system including using GM's Onstar™ system.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing vehicle communications, said method comprising:
   providing an authorized user of a vehicle with a consumer electronic device;
   transmitting an FM signal from the vehicle to the consumer electronic device where the FM signal includes vehicle information, where the FM signal is a frequency modulation signal in an FM frequency band;

decoding the FM signal in the consumer electronic device; and transmitting, in a format other than FM, a command signal from the consumer electronic device to the vehicle to automatically perform a predetermined vehicle operation in response to the consumer electronic device receiving the FM signal.

2. The method according to claim 1 wherein transmitting the command signal includes transmitting the command signal using a Bluetooth format.

3. The method according to claim 1 wherein transmitting the command signal includes transmitting the command signal using a WiFi format.

4. The method according to claim 1 wherein transmitting the command signal includes transmitting the command signal using cellular telephone signals.

5. The method according to claim 1 wherein the vehicle operation is selected from the group consisting of unlocking vehicle doors, turning on a vehicle light and extending at least one vehicle door handle on the vehicle.

6. The method according to claim 1 further comprising displaying the vehicle information on the consumer electronic device.

7. The method according to claim 1 wherein transmitting the FM signal includes transmitting the FM signal about every second.

8. The method according to claim 1 wherein the vehicle information includes vehicle tire pressure, vehicle fuel level and vehicle battery state-of-charge.

9. The method according to claim 1 wherein transmitting the FM signal includes transmitting the FM signal at a power level that limits the transmission to only within a few meters of the vehicle.

10. The method according to claim 1 wherein the consumer electronic device is a smart phone.

11. A method for providing vehicle communications, said method comprising:

providing an authorized user of a vehicle with a smart phone;

transmitting an FM signal from an FM transmitter in the vehicle to the smart phone where the FM signal includes vehicle information, wherein transmitting the FM signal includes transmitting the FM signal at a power level that limits the transmission to only within a few meters of the vehicle, and wherein the vehicle information includes vehicle tire pressure, vehicle fuel level and vehicle battery state-of-charge, where the FM signal is a frequency modulation signal in an FM frequency band which is periodically transmitted on an ongoing basis;

decoding the FM signal in the smart phone; and transmitting a command signal from the smart phone to the vehicle to automatically perform a predetermined vehicle operation in response to the smart phone receiving the FM signal, wherein transmitting the command signal includes transmitting the command signal using a Bluetooth format.

12. The method according to claim 11 wherein transmitting the FM signal includes transmitting the FM signal about every second.

13. A vehicle communications system comprising:

a consumer electronic device operable to be carried by an authorized user of a vehicle;

an FM transmitter on the vehicle coupled to an FM antenna on the vehicle, where the FM antenna is also used by an FM radio receiver; and a control module on the vehicle, said control module being configured to cause the FM transmitter to transmit an FM signal that includes information about the vehicle, where the FM signal is a frequency modulation signal in an FM frequency band, said consumer electronic device receiving the FM signal if the consumer electronic device is within a range of the vehicle which enables reception of the FM signal, said consumer electronic device automatically transmitting, in a format other than FM, a command signal from the consumer electronic device to the vehicle to cause the vehicle to perform a predetermined vehicle operation if the consumer electronic device receives the FM signal.

14. The system according to claim 13 wherein the consumer electronic device is a smart phone.

15. The system according to claim 13 wherein the consumer electronic device uses a Bluetooth format to transmit the command signal.

16. The system according to claim 13 wherein the consumer electronic device uses a WiFi format to transmit the command signal.

17. The system according to claim 13 wherein the consumer electronic device uses cellular telephone signals to transmit the command signal.

18. The system according to claim 13 wherein the vehicle operation is selected from the group consisting of unlocking vehicle doors, turning on a vehicle light and extending at least one vehicle door handle on the vehicle.

19. The system according to claim 13 wherein the FM transmitter transmits the FM signal about once every second.

20. The system according to claim 13 wherein the FM transmitter transmits the FM signal at a power level that limits the FM signal to only within a few meters of the vehicle.

* * * * *